C. SCHWEINLE AND J. J. HAUERWAS.
CONTROL MECHANISM FOR REFRIGERATING APPARATUS.
APPLICATION FILED NOV. 2, 1917.

1,302,596.

Patented May 6, 1919.
2 SHEETS—SHEET 1.

Inventors
Charles Schweinle
John J. Hauerwas,
By Mursell, Keeney & French
Attorneys.

C. SCHWEINLE AND J. J. HAUERWAS.
CONTROL MECHANISM FOR REFRIGERATING APPARATUS.
APPLICATION FILED NOV. 2, 1917.
1,302,596.
Patented May 6, 1919.
2 SHEETS—SHEET 2.
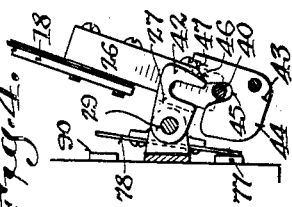
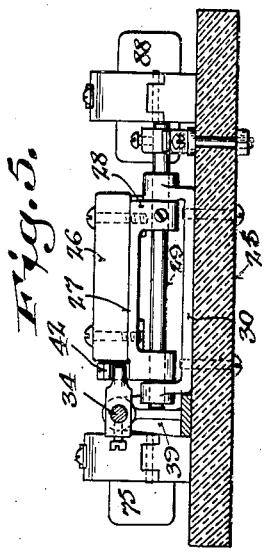
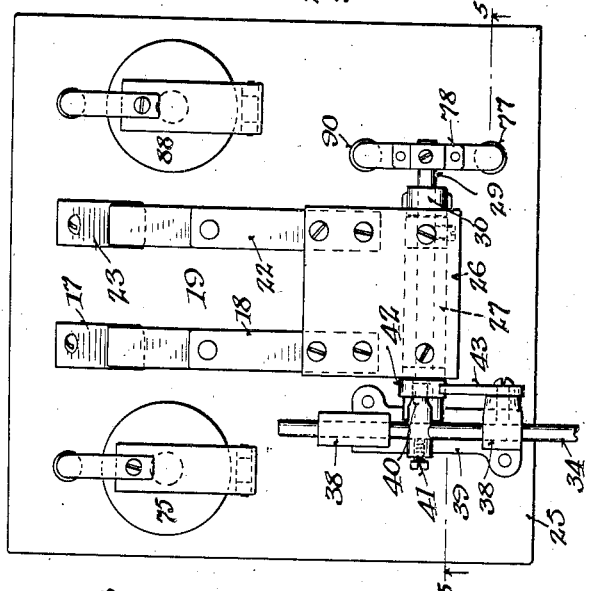
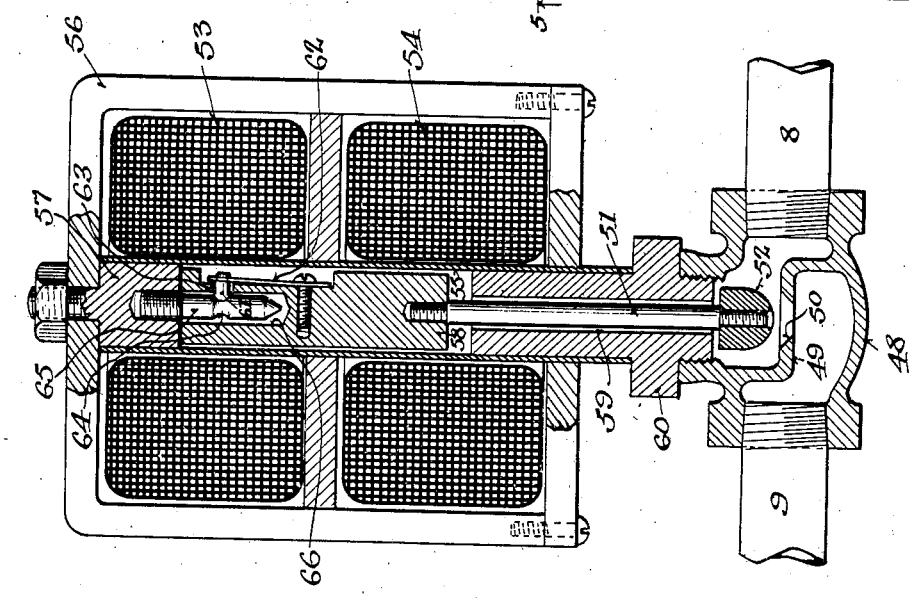
Inventors
Charles Schweinle
John J. Hauerwas,
By Ursell, Keeney & French
Attorneys.

UNITED STATES PATENT OFFICE.

CHARLES SCHWEINLE AND JOHN J. HAUERWAS, OF MILWAUKEE, WISCONSIN, ASSIGNORS TO SANITARY REFRIGERATING MACHINERY COMPANY, OF MILWAUKEE, WISCONSIN, A CORPORATION OF WISCONSIN.

CONTROL MECHANISM FOR REFRIGERATING APPARATUS.

1,302,596.  Specification of Letters Patent.  Patented May 6, 1919.

Application filed November 2, 1917. Serial No. 199,824.

*To all whom it may concern:*

Be it known that we, CHARLES SCHWEINLE and JOHN J. HAUERWAS, citizens of the United States, and residents of Milwaukee, in the county of Milwaukee and State of Wisconsin, have invented new and useful Improvements in Control Mechanism for Refrigerating Apparatus, of which the following is a description, reference being had to the accompanying drawings, which are a part of this specification.

The invention relates to control mechanism for refrigerating apparatus.

One object of the invention is to provide a fluid pressure controlled switch for the motor which furnishes power to the refrigerating apparatus.

Another object of the invention is to provide a thermostatically controlled electrically operated water valve to shut off or turn on the water so that the pressure controlled switch may be opened or closed.

Another object of the invention is to provide a safety-gage controlled switch for the refrigerant to shut off the power should the pressure of the refrigerant become excessive.

Another object of the invention is to provide for keeping the fluid pressure controlled switch for the motor closed under ordinary variations in the pressure of the cooling liquid passing through the condenser.

The invention further consists in the several features hereinafter set forth.

In the drawings:

Fig. 2 is an elevation view of the main switch board;

Fig. 3 is a section taken on the line 3—3 of Fig. 2;

Fig. 4 is a detail view similar to Fig. 3 showing the motor switch open;

Fig. 5 is a section taken on line 5—5 of Fig. 2;

Fig. 6 is a vertical sectional view through the electrically operated water valve.

Figure 1:
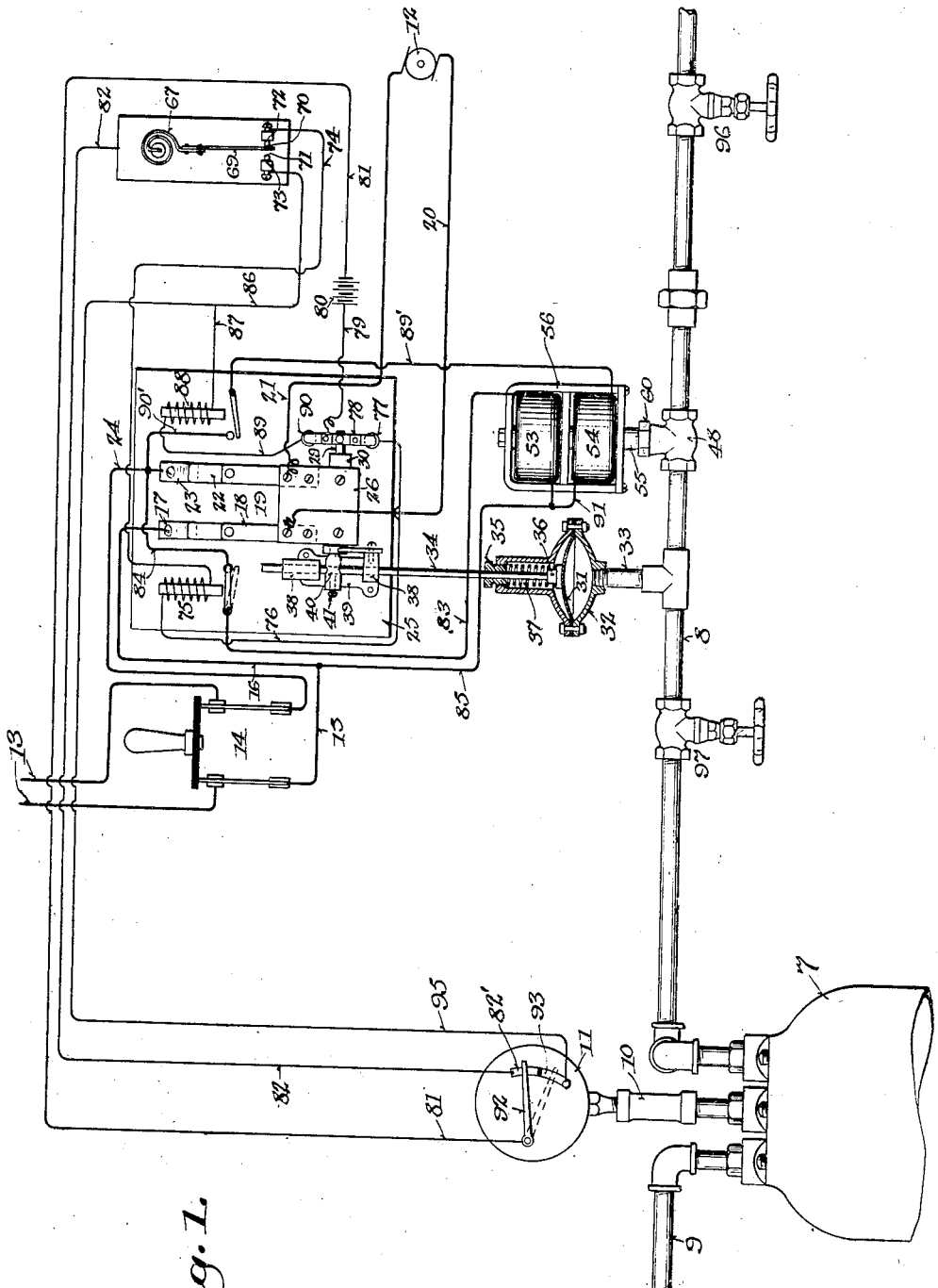
Figure 1 is a view of the device embodying the invention showing it connected up with the condenser and the fluid cooling system for the condenser, the fluid pressure means for operating the motor control switch being shown in section.

In the drawings: the numeral 7 designates the usual condenser, 8 the water inlet pipe for conducting the cooling water to the condenser, 9 the water outlet, 10 a gage pipe, 11 a pressure gage of any suitable construction, and 12 the motor for driving the compressor, not shown.

Current is supplied to the motor from one side of the line 13 through a knife switch 14, conductors 15 and 16, contact 17 and blade contact 18 of the fluid pressure operated switch 19, conductor 20 to the motor, conductor 21 leading from the motor to the blade contact 22 of the switch 19, contact 23, conductor 24 to knife switch 14 and thence to the other side of the line 13. The circuit to the line is closed through the closing of the knife switch 14 and when the contacts 18 and 22 are in engagement with the contacts 17 and 23 respectively the work circuit is closed and the motor 12 operated to drive the compressor.

The switch 19 is controlled by fluid pressure, the switch being operated by pressure operated means and water in the cooling system is turned off or on by a thermostatically controlled electrically operated valve.

The contacts 17 and 23 of the switch 19 are mounted upon a switch board 25 and the blade contacts 17 and 18 are secured to a block 26 of insulating material which is secured to a member 27 having arms 28 secured to a shaft 29 which is pivotally mounted in the arms of a bracket 30 secured to the switch board, the construction providing for the blades 18 and 22 to be swung into and out of contact with the contacts 17 and 23 respectively.

The pressure operated means for operating the switch 19 consists of a diaphragm 31 mounted in a casing 32 which communicates at its lower end with the inlet pipe 8 through a pipe 33. A sliding actuating rod 34 passes through a screw plug 35 in the casing 32 and its headed end 36 rests upon the diaphragm 31. The diaphragm is normally held against upward movement by a spring 37 inclosed within the casing and interposed between the plug 35 and the head 36. When the cooling water is turned on the pressure of the water against the diaphragm overcomes the action of the spring 37 and the rod moves upwardly. The upper end of the rod is slidably mounted in bearings in arms 38 on a bracket 39. The rod has a laterally projecting arm 40 adjustably connected thereto by a set screw 41 which arm engages a hooked projection 42 on the member 27 of the switch 19 whereby the vertical reciprocation of the rod 37 will swing the movable contact carrying portion of the switch to open or closed position. In order that the switch may be held closed under ordinary variations in water pressure we provide a latch 43 pivotally secured to the lower arm 38 of the bracket 39 and having a weighted end 44, a notch 45, cam surface 46 and locking notch 47. When the switch is moved to closed position by the upward movement of the rod 37 and arm 40 through the pressure of the water against the diaphragm 31, the gravity actuated latch 43 swings over until the end of the hook 42 engages the notch 47 of the latch, as shown in Fig. 3. As the notch forming the hook 42 is of some length the arm 40 may move up and down under ordinary variations of pressure without opening the switch. When, however, the water pressure falls below working pressure or the water is shut off the spring 37 moves the rod 34 and arm 40 downwardly, the arm then striking the cam surface 46 of the latch disengaging it from the hook 42 and then moving downwardly into the notch 45, thus releasing the switch which swings on its pivot under the action of gravity and thus opens the motor circuit. Thus the switch 19 is closed when the cooling water is circulating under working pressure but should the pressure drop to any extent or cease the pressure valve causes the switch to move to open position and thus stop the motor.

The thermostatically controlled electrically operated valve comprises a fittting 48 in the inlet pipe 8 having a web section 49 provided with an aperture 50 having tapered sides forming a valve seat, a stem 51 carrying a valve head 52 adapted to register with the seat to shut off the water and thermostatically controlled electrically operated means for operating said valve.

The electrical means for operating the valve consists of a double solenoid consisting of a coil 53 and coil 54 surrounding portions of a sleeve 55 and carried by a frame 56 secured to a plug 57 in the upper part of the sleeve, and a core 58 secured to the stem 51 and movable within the sleeve, said stem being slidably mounted in a bore 59 in a member 60 secured to the fitting 48 and carrying the sleeve 55. The valve is releasably held in open position by means of a locking lug 61, carried by a spring 62 secured to the core 58 and slidably mounted in an aperture 63 in said core to engage in an annular groove 64 on a rod 65 secured to the plug 57 and extending into a bore 66 in the core 58. The coil 53 will be termed the "on" coil and the coil 54 the "off" coil. The coil 53 when energized raises the core 58 with the valve stem to open position where it is releasably held by the lug 61 engaging the rod 65. When the coil 54 is energized the core 58 is moved down disengaging the lugs 61 from the rod 65 and the valve closes.

The operation of the coils 53 and 54 are controlled through a thermostat in the following manner: The thermostat coil 67 mounted on a base 68 carries an arm 69 provided with contact points 70 and 71 which are adapted to respectively engage contacts 72 and 73. A conductor 74 connects the contact 72 with the coil of an electromagnetic switch 75 and a conductor 76 leads from said coil to a fixed contact 77. A flexible contact 78 adapted to engage the contact 76 is secured to the pivoted shaft 29 of the switch 19 and a conductor 79 connects this contact with one pole of a battery 80 or other suitable source of current. The switch 75 closes and opens the circuit to the coil 53 by connecting or disconnecting conductors 83 and 84, the conductor 83 being connected to one end of the coil 53 and the conductor 84 being connected to the conductor 24. The other end of the coil 53 is connected to the conductor 16 by a conductor 85. Conductors 86 and 87 connect the contact 73 with the coil of an electromagnetic switch 88 and a conductor 89 leads from this coil to a fixed contact 90 which is adapted to be engaged by the contact 78. The switch 88 closes and opens the circuit to the coil 54 by connecting and disconnecting conductors 89' and 90', the conductor 89' being connected to one end of the coil 54 and conductor 90' being connected to the conductor 24. A conductor 91 connects the other end of the coil 54 with the conductor 85.

If for any reason the refrigerant pressure should increase above the working pressure, we have provided a gage controlled switch consisting of a switch arm 92 connected to the pressure responsive member, not shown, of the refrigerant pressure gage 11 and moved by it under excessive pressure into contact with a fixed contact 93. A conductor 81 connects the arm 92 with the battery 80 and a conductor 95 connects the contact 93 with the conductor 87. A conductor 82 connects a contact 82' on the gage to the base 68 of the thermostat T so that the thermostat is normally in circuit with the battery through conductor 82, contact 82', arm 92 and conductor 81. A manually shut off valve 96 and a pressure regulating valve 97 are also placed on the inlet pipe 8 to shut off the water.

In the construction above described when it is desired to start the refrigerating machine the switch 14 is thrown in and the valves 96 and 97 are opened and the water passes through the pipe 8 into the condenser 7 and out. Thereupon the pressure of the water acting against the diaphragm 31 raises the rod 34 which through the mechanism previously described closes and locks the switch 19 to complete the motor circuit through the motor 12 which then drives the compressor. In starting the thermostat which is in the chest or receptacle to be cooled is in its "on" position, that is the contact 70 contacts with the contact 72 and the switch 75 is energized by current passing from the battery 80 through conductor 79, contacts 78 and 77, conductor 76, switch 75, conductor 74, contacts 72, 70, arm 69, coil 67, base 68, conductor 82, contact 82', arm 92, conductor 81 back to the battery 80. The energizing of the switch 75 connects up the conductors 83 and 84 so that current passes from the line conductor 15 through the conductor 85, through the coil 53, thence through conductors 83 and 84 to the conductor 24, thus energizing the coil 53 which moves the solenoid 58 upwardly opening the valve which is releasably secured in open position by the means previously described. Of course it will be understood that the opening of the electrically controlled water valve occurs as soon as the switch 14 is thrown in and before the switch 19 closes. On the closing of the switch 19 the connection between the contacts 77 and 78 is broken thus shutting off the thermostatic circuit which opens the switch 75 to cut out the coil 53, the water valve being now held in open position. The apparatus is now in working condition with the motor running and the cooling water flowing through the condenser.

If now for any reason the water pressure should decrease below working pressure the diaphragm 31 moves back and the rod 34 moves down opening the switch 19 and stopping the motor and consequently the operation of the compressor.

With the apparatus running, the switch 19 being in, contact 78 is in contact with the contact 90. Under these conditions as soon as the receptacle or chest is cooled to the desired temperature, the arm 69 of the thermostat T moves to bring the contacts 71 and 73 together which completes the circuit through the electromagnetic switch 88, the current passing from the battery 80 through the conductor 79, contacts 78 and 90, conductor 89, switch 88, conductors 87 and 86, contacts 73 and 71, arm 69, coil 67, base 68, conductor 82, contact 82', arm 92 and conductor 81 back to the battery 80. The energizing of the switch 88 connects up the conductors 90' and 89' so that current passes from the line conductor 15 through conductors 85 and 91, coil 54, conductors 89' and 90' to the conductor 24, thus energizing the coil 54 which releases the locked open valve 51, 52 which moves down upon the seat 50 and shuts off the water supply. The shutting off of the water supply immediately restores the diaphragm to normal position and the switch 19 is thrown out as previously described. The throwing out of the switch 19 stops the motor 12 and opens the thermostatic circuit by moving the contact 78 away from the contact 90. The opening of this thermostatic circuit opens the switch 88 and the current through the coil 54 is cut out. As soon as the temperature in the receptacle or chest being cooled increases so as to move the arm 69 into contact with contact 72, the machine is again started through the opening of the electrically controlled water valve and the starting of the motor through the closing of the switch 19.

The pipe 10 communicates with the interior of the condenser and the pressure of the refrigerant in the condenser is indicated by the gage 11. If for any reason the pressure of the refrigerant in the condenser becomes excessive the pressure responsive member of the gage moves the arm 92 down into contact with the contact 93 and the switch 19 being in, the current passes from the battery 80 through conductor 79, contacts 78 and 90, conductor 89, switch 88, conductors 87 and 95, contacts 93 and 92, conductor 81 back to the battery closing the switch 88 which connects up the conductors 89' and 90' which through the circuit previously described energizes the coil 54 to close the water valve. As soon as the pressure in the cooling system is cut down by the shutting off of the water, the switch 19 is opened as previously described and the motor stopped. Under these conditions the switch arm 92 is disconnected from the contact 82' so that the thermostat is cut out and any liability of the switch 75 operating is prevented.

The invention thus exemplifies a construction in which the operation of the machine is controlled through the pressure of the water in the cooling system whereby a variance in the water pressure itself will start or stop the machine or the thermostatic control will produce a variance in the water pressure to start or stop the machine or the pressure of the refrigerant will produce a variance in the water pressure to stop the machine.

We are aware that the details of construction herein shown and described are capable of some modification and change, and therefore we desire it to be understood that such changes in construction as come within the scope of the appended claims we deem to be within the spirit of our invention.

What we claim as our invention is:

1. In a refrigerating apparatus, the combination, with the refrigerant cooling system, a work circuit, of a motor in said circuit for driving the compressor, of a switch for opening and closing said circuit, fluid pressure operated means for controlling said switch on a change in pressure of the fluid in the refrigerant cooling system, a valve in said refrigerant cooling system for controlling the passage of fluid therethrough, a regulator circuit thermostatically controlled electrically operated means in said regulator circuit for operating said valve, and means for opening and closing the regulator circuit on the opening and closing of said switch.

2. In a refrigerating apparatus, the combination, with the circulating system for the cooling water, of a work circuit, a motor in said circuit for driving the compressor, of a switch for opening and closing said circuit, fluid pressure operated means for controlling said switch, a valve in said circulating system, thermostatically controlled electrically operated means for operating said valve, and means for operating said valve should the pressure of the refrigerant become excessive.

3. In a refrigerating apparatus, the combination, with the circulating system for the cooling water, of a work circuit, a motor in said circuit, a switch for opening and closing said circuit, means responsive to variations in pressure of the cooling water in said circulating system for controlling said switch, a valve in said circulating system for controlling the passage of cooling water therethrough, and electrically operated means for operating said valve controlled by said switch.

4. In a refrigerating apparatus, the combination, with the fluid cooling system for the condesner, a valve for controlling the passage of fluid through said system, and refrigerant pressure responsive means for operating said valve.

5. In a refrigerating apparatus, the combination, with the circulating system for the cooling water, of an electric switch, a diaphragm within said circulating system responsive to pressure of the water therein, means operatively connected to said diaphragm for cooling and opening said switch, and means for holding the switch closed under ordinary variations in the pressure of the water within the circulating system.

6. In a refrigerating apparatus, the combination, with the circulating system for the cooling water, of a valve for controlling the passage of water through said system, an electrical control circuit, solenoids in said circuit for opening and closing said valve, thermostatically controlled means for opening and closing said control circuit to operate said solenoids, and pressure responsive means in said circulating system for controlling the control circuit.

7. In a refrigerating apparatus, the combination, with the circulating system for the cooling water, of a valve for controlling the passage of water through said system, an electrical control circuit, a solenoid in said circuit for opening said valve, means for securing the valve in open position and cutting out said solenoid, a solenoid in said circuit for closing the valve, and means for cutting out the last mentioned solenoid when the valve is closed.

8. In a refrigerating apparatus, the combination, with the circulating system for the cooling water, of a work circuit, a motor in said circuit, of a switch for opening and closing the work circuit, means controlled by the pressure of the water in said circulating system for opening and closing said switch, a control circuit, a thermostatic switch in said control circuit, a switch for completing the control circuit when said thermostat is in its "On" or "Off" position, a valve in the circulating system, electromagnetic means for opening and closing said valve, a control circuit for said electromagnetic means, and electromagnetically operated switches in the first control circuit for opening and closing the second control circuit.

9. In a refrigerating apparatus, the combination, with the circulating system for the cooling water, of a work circuit, a motor in said circuit, a work circuit switch, means for operating said switch, a control circuit, a thermostatic switch in said control circuit, a second switch in said control circuit controlled by said work circuit switch, a second control circuit, a valve in the circulating system, and electromagnetic means in said second control circuit for operating said valve.

10. In a refrigerating apparatus, the combination, with the circulating system for the cooling water, of a work circuit, a motor in said circuit, a work circuit switch, means for operating said switch, a control circuit, a thermostatic switch in said control circuit, a second control circuit controlled by the first, a valve in the circulating system, electrically operated means in said second control circuit for operating said valve, and means controlled by the opening and closing of said work circuit switch for opening and closing the first control circuit.

In testimony whereof we affix our signatures.

CHARLES SCHWEINLE.
JOHN J. HAUERWAS.